(12) United States Patent
Ichikawa et al.

(10) Patent No.: US 9,961,140 B2
(45) Date of Patent: May 1, 2018

(54) INFORMATION PROCESSING APPARATUS, INFORMATION PROCESSING METHOD, PROGRAM, AND INFORMATION RECORDING MEDIUM

(71) Applicant: Sony Computer Entertainment Inc., Tokyo (JP)

(72) Inventors: Keisuke Ichikawa, Kanagawa (JP); Eiichi Nishina, Tokyo (JP)

(73) Assignee: Sony Interactive Entertainment Inc., Tokyo (JP)

( * ) Notice: Subject to any disclaimer, the term of this patent is extended or adjusted under 35 U.S.C. 154(b) by 507 days.

(21) Appl. No.: 14/421,635

(22) PCT Filed: Aug. 16, 2013

(86) PCT No.: PCT/JP2013/072013
§ 371 (c)(1),
(2) Date: Feb. 13, 2015

(87) PCT Pub. No.: WO2014/034441
PCT Pub. Date: Mar. 6, 2014

(65) Prior Publication Data
US 2015/0207876 A1 Jul. 23, 2015

(30) Foreign Application Priority Data

Aug. 27, 2012 (JP) ................. 2012-186553

(51) Int. Cl.
| G06F 15/173 | (2006.01) |
| H04L 29/08 | (2006.01) |
| H04L 12/24 | (2006.01) |

(52) U.S. Cl.
CPC .......... *H04L 67/1095* (2013.01); *H04L 41/50* (2013.01); *H04L 67/14* (2013.01)

(58) Field of Classification Search
CPC ...... H04L 69/28; H04L 67/14; H04L 67/1095; H04L 41/50; H04W 60/02; H04W 76/022; G06F 13/00
See application file for complete search history.

(56) References Cited

U.S. PATENT DOCUMENTS

| 8,676,225 B2 | 3/2014 | Rekimoto |
| 9,228,852 B2 | 1/2016 | Kaido |

(Continued)

FOREIGN PATENT DOCUMENTS

| CN | 101277240 A | 10/2008 |
| EP | 2391173 A1 | 11/2011 |

(Continued)

OTHER PUBLICATIONS

Machine translation: JP 2004-348319 (IDS).*

(Continued)

*Primary Examiner* — Kevin T Bates
*Assistant Examiner* — Ronak Patel
(74) *Attorney, Agent, or Firm* — Matthew B. Dernier, Esq.

(57) ABSTRACT

A timing at which communication is to be attempted subsequently is set such that a timing when an information processing apparatus is incommunicatable with a communication counterpart and communication is not carried out is later than a timing when a condition different from the condition that the information apparatus is incommunicatable with a communication counterpart is satisfied and communication is not carried out. When communication with a server is impossible, a timing is set later by a time period than the communication timing as a new communication timing but sets, if a predetermined condition different from a condition that communication with the server is impossible is satisfied, a timing later by a time period, which is shorter than the time period, than the communication timing as a new communication timing.

9 Claims, 5 Drawing Sheets

(56) References Cited

U.S. PATENT DOCUMENTS

| | | | |
|---|---|---|---|
| 2008/0242278 A1* | 10/2008 | Rekimoto | H04L 63/0407 |
| | | | 455/414.2 |
| 2010/0005523 A1* | 1/2010 | Hassan | G06F 21/31 |
| | | | 726/19 |
| 2011/0296039 A1 | 12/2011 | Deu-Ngoc | |
| 2012/0188209 A1 | 7/2012 | Kaido | |
| 2016/0100284 A1 | 4/2016 | Rekimoto | |

FOREIGN PATENT DOCUMENTS

| | | | |
|---|---|---|---|
| JP | 2004348319 A | 12/2004 |
| JP | 2008228125 A | 9/2008 |
| JP | 2009130438 A | 6/2009 |
| JP | 2012154818 A | 8/2012 |

OTHER PUBLICATIONS

Machine translation: JP 2009-130438 (IDS).*
Machine translation: JP 2008-228125 (IDS).*
Office Action for corresponding CN Application No. 12013800432672, 8 pages, dated Aug. 11, 2016.
International Search Report for corresponding PCT Application No. PCT/JP2013/072013, dated Nov. 19, 2013.
European Search Report for corresponding PCT Application No. 13833838.9, 6 pages, dated Mar. 17, 2016.
International Preliminary Report and Written Opinion for corresponding PCT Application No. PCT/JP2013/072013, dated Mar. 5, 2015.
Office Action for corresponding JP Application No. 2016019937, 12 pages, dated Jul. 4, 2017.

* cited by examiner

INFORMATION PROCESSING APPARATUS, INFORMATION PROCESSING METHOD, PROGRAM, AND INFORMATION RECORDING MEDIUM

TECHNICAL FIELD

The present invention relates to an information processing apparatus, information processing method, a program, and an information processing medium.

BACKGROUND ART

For example, information processing apparatus are available which carry out, when a set communication timing comes, such communication with a server which is a counterpart of communication as registration of data into the server or acquisition of data from the server.

Such information processing apparatus include an information processing apparatus which does not carry out, even if a set communication timing comes, communication when such a predetermined condition is satisfied that, for example, communication with a counterpart of communication is impossible or data communication is being carried out in accordance with a request from a user, but delays the setting of the communication timing such that, when the communication timing after delayed comes, communication is attempted again.

SUMMARY

Technical Problem

If a situation in which an information processing apparatus is incommunicatable with a communication counterpart occurs, then unless the situation is eliminated, the information processing apparatus is not placed into a communicatable state with the communication counterpart. For example, where the information processing apparatus is a portable information processing apparatus such as a portable game terminal and exists at a place at which it is not communicatable with a communication counterpart, unless the information processing apparatus is moved to a place at which it is communicatable with the communication counterpart, the information processing apparatus and the communication counterpart are not placed into a communicatable state with each other. In a case in which the information processing apparatus is not communicatable with the communication counterpart, it is considered that the possibility that communication may not be carried out also at a next communication timing is higher than that in any other case.

However, in a conventional information processing apparatus, whatever a cause by which communication is not carried out is, when a communication timing is delayed by a predetermined interval of time and the communication timing after delayed comes, communication is attempted again. It is to be noted that the situation in which an information processing apparatus is incommunicatable with a communication counterpart is not the situation wherein a portable information processing apparatus such as a portable game terminal exists at a place at which it is incommunicatable with the communication counterpart.

The present invention has been made in view of such a subject as described above, and one of objects of the present invention is to set the timing at which communication is to be attempted subsequently such that the timing when an information processing apparatus is incommunicatable with a communication counterpart and communication is not carried out is later than the timing when a condition different from the condition that the information apparatus is incommunicatable with a communication counterpart is satisfied and communication is not carried out.

Solution to Problem

In order to solve the subject described above, according to the present invention, there is provided an information processing apparatus including a communication unit configured to communicate data, and a setting unit configured to set, when a set communication timing comes, if communication with a communication counterpart is impossible, a timing later by a first time period than the set communication timing as a new communication timing but set, if a predetermined condition different from a condition that communication with a communication counterpart is impossible is satisfied, a timing later by a second time period, which is shorter than the first time period, than the set communication timing as a new communication timing, the communication unit communicating, when the set communication timing comes, data with the communication counterpart if the predetermined condition is not satisfied and besides communication with the communication counterpart is possible.

Further, according to the present invention, there is provided an information processing method including a first setting step of setting, when a set communication timing comes, if communication with a communication counterpart is impossible, a timing later by a first time period than the set communication timing as a new communication timing, a second setting step of setting, when the set communication timing comes, if a predetermined condition different from a condition that communication with a communication counterpart is impossible is satisfied, a timing later by a second time period, which is shorter than the first time period, than the set communication timing as a new communication timing, and a communication step of communicating, when the set communication timing comes, data with the communication counterpart if the predetermined condition is not satisfied and besides communication with the communication counterpart is possible.

Further, according to the present invention, there is provided a program for causing a computer to function as a communication unit configured to communicate data, and a setting unit configured to set, when a set communication timing comes, if communication with a communication counterpart is impossible, a timing later by a first time period than the set communication timing as a new communication timing but set, if a predetermined condition different from a condition that communication with a communication counterpart is impossible is satisfied, a timing later by a second time period, which is shorter than the first time period, than the set communication timing as a new communication timing, the communication unit communicating, when the set communication timing comes, data with the communication counterpart if the predetermined condition is not satisfied and besides communication with the communication counterpart is possible.

Further, according to the present invention, there is provided a computer-readable information recording medium in or on which a program is stored, the program causing a computer to function as a communication unit configured to communicate data, and a setting unit configured to set, when a set communication timing comes, if communication with a communication counterpart is impossible, a timing later by a first time period than the set communication timing as a new communication timing but set, if a predetermined condition different from a condition that communication with a communication counterpart is impossible is satisfied, a timing later by a second time period, which is shorter than the first time period, than the set communication timing as a new communication timing, the communication unit communicating, when the set communication timing comes, data with the communication counterpart if the predetermined condition is not satisfied and besides communication with the communication counterpart is possible.

In the present invention, if the information processing apparatus is incommunicatable with a communication counterpart and communication is not carried out, then a timing later by the first time period than the set communication timing is set as a new communication timing. Then, if the predetermined condition different from the condition that the information processing apparatus is incommunicatable with the communication counterpart is satisfied and communication is not carried out, then a timing later by the second time period, which is shorter than the first time period, than the set communication timing is set as a new communication timing. In this manner, with the present invention, when the information processing apparatus is incommunicatable with the communication counterpart and communication is not carried out, the timing at which communication is to be attempted subsequently is set later than the timing when the condition different from the condition that the information processing apparatus is incommunicatable with the communication counterpart is satisfied and communication is not carried out.

According to a mode of the present invention, the setting unit sets, when the set communication timing comes, a timing later by the second time period than the set communication timing as a new communication timing if communication of data in accordance with a request from a user is being carried out by the communication unit.

Further, according to a mode of the present invention, the setting unit sets, when communication of data by the communication unit comes to an end, a timing determined from within a time range determined in advance as a new communication timing.

Further, according to a mode of the present invention, the setting unit sets a timing determined from within a time range determined in advance as a new communication timing when the predetermined condition is not satisfied and communication of data carried out by the communication unit when communication with the communication counterpart is possible comes to an end.

Further, according to a mode of the present invention, the setting unit sets a timing determined from within a time range determined in advance as a new communication timing if, when the set communication timing comes, communication with the communication counterpart is impossible and besides a day to which the timing later by the first time period than the set communication timing is a next day to a day to which the set communication timing belongs.

Further, according to a mode of the present invention, the setting unit sets a timing determined from within a time range determined in advance as a new communication timing if, when the set communication timing comes, the predetermined condition is satisfied and besides a day to which the timing later by the second time period than the set communication timing is a next day to a day to which the set communication timing belongs.

DESCRIPTION OF EMBODIMENT

In the following, an embodiment of the present invention is described in detail with reference to the drawings.

Figure 1:
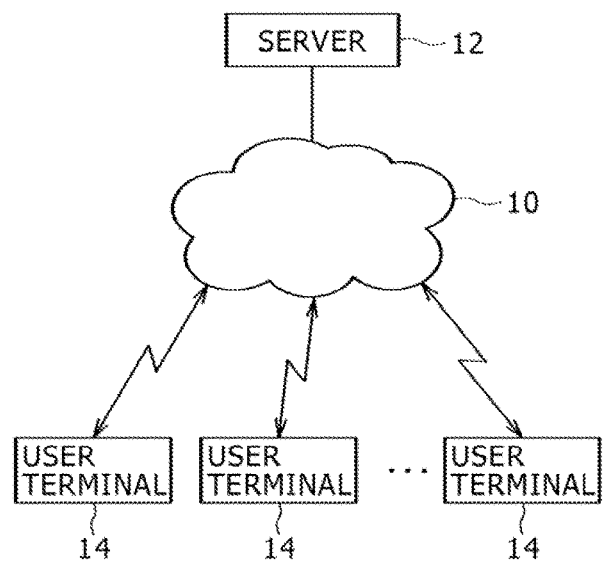
FIG. 1 is a view depicting a general configuration of an information processing system according to an embodiment of the present invention.

FIG. 1 is a view depicting a general configuration of an information processing system according to an embodiment of the present invention. As depicted in FIG. 1, in the present information processing system, a server 12 and a plurality of user terminals 14 are connected to a computer network 10 such as the Internet.

The server 12 is configured principally from a known server computer including, for example, a control unit which is a program controlling device such as a CPU which operates in accordance with a program installed in the server 12, a storage unit which is a storage device such as a ROM or a RAM or a hard disk drive, a communication unit such as a network board, and so forth.

Figure 2:
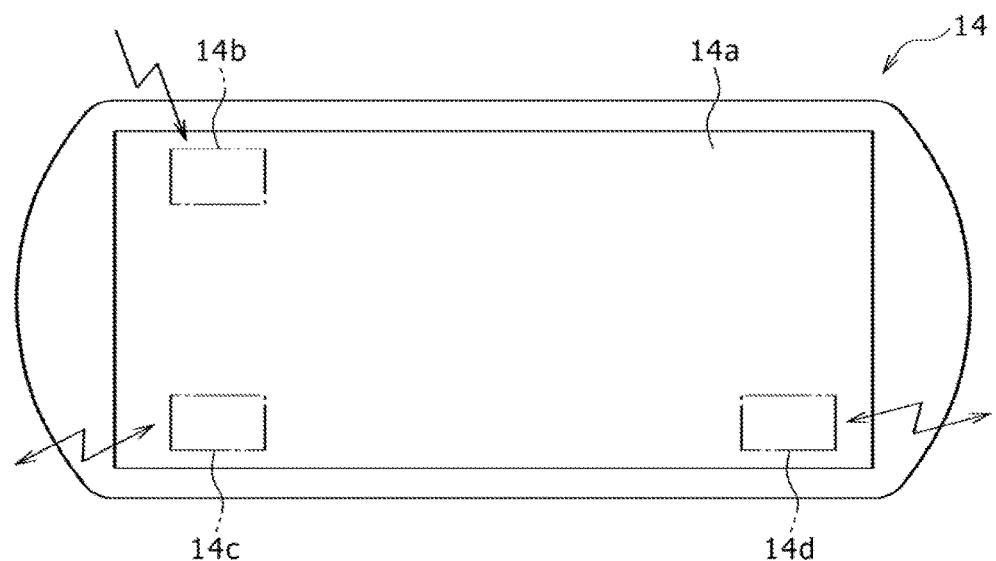
FIG. 2 is a view depicting an example of an appearance of a user terminal.

Meanwhile, each user terminal 14 is a portable computer game system which is driven by a battery and functions as an information processing apparatus in the present embodiment. The user terminal 14 includes a touch screen 14a on a front face thereof as depicted in FIG. 2 which depicts an example of an appearance of the computer game system. Further, the user terminal 14 has built therein a position measurement unit 14b for measuring the position (latitude and longitude) of the user terminal 14 utilizing the GPS (Global Positioning System). The user terminal 14 further has built therein a communication unit for carrying out data communication (in the present embodiment, for example, a portable telephone communication unit 14c for carrying out data communication utilizing a portable telephone network and a wireless LAN communication unit 14d for carrying out data communication utilizing a wireless LAN). The user terminal 14 further includes a control unit which is a program controlling device such as a CPU which operates in accordance with a program installed in the user terminal 14, a storage unit which is a storage device such as a ROM or a RAM, a hard disk drive or the like, a button and so forth. The user terminal 14 selectively utilizes the portable telephone communication unit 14c or the wireless LAN communication unit 14d in response to a communication environment to establish connection to the computer network 10 so that it can carry out data communication with the server 12.

The user terminal 14 according to the present embodiment repetitively measures the position of the own machine utilizing satellite signals and retains results of the measurement. It is to be noted that the user terminal 14 may measure the position by any other method. Further, the user terminal 14 retains also data representative of actual results of execution of a game program. The results of position measurement and the data of the actual results of execution of the game are uploaded to the server 12 in response to a user operation or automatically after every fixed interval of time. The server 12 retains results of position measurement and data of actual results of execution uploaded from a large number of user terminals 14 in this manner.

Figure 3:
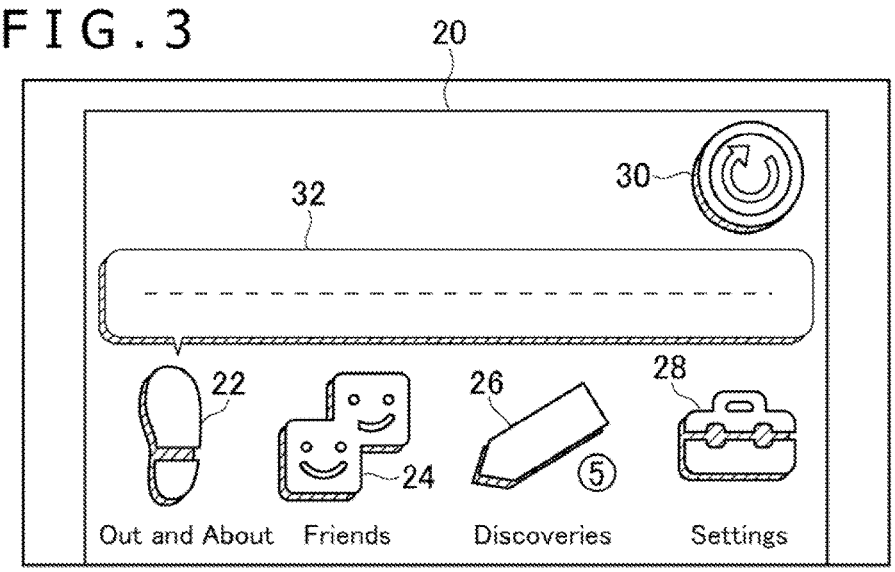
FIG. 3 is a view depicting an example of a main menu image.

FIG. 3 depicts an example of a main menu image 20 displayed on the touch screen 14a of the user terminal 14. The main menu image 20 is displayed first after the user terminal 14 is started up and executes a program according to the present embodiment. On the main menu image 20, a button icon 22, another button icon 24, a further button icon 26, a still button icon 28, a yet further button icon 30, and a message 32 are arranged. In the present embodiment, the button icon 22, button icon 24, button icon 26, button icon 28, and button icon 30 can be operated by a user tapping the touch screen 14a (in other words, they can be tapped by a user).

In the message 32, information relating to the button icon 22, button icon 24, button icon 26, and button icon 28 is displayed. Further, the user can cause also details of the message 32 to be displayed on the touch screen 14a by tapping the region of the message 32.

Figure 4:
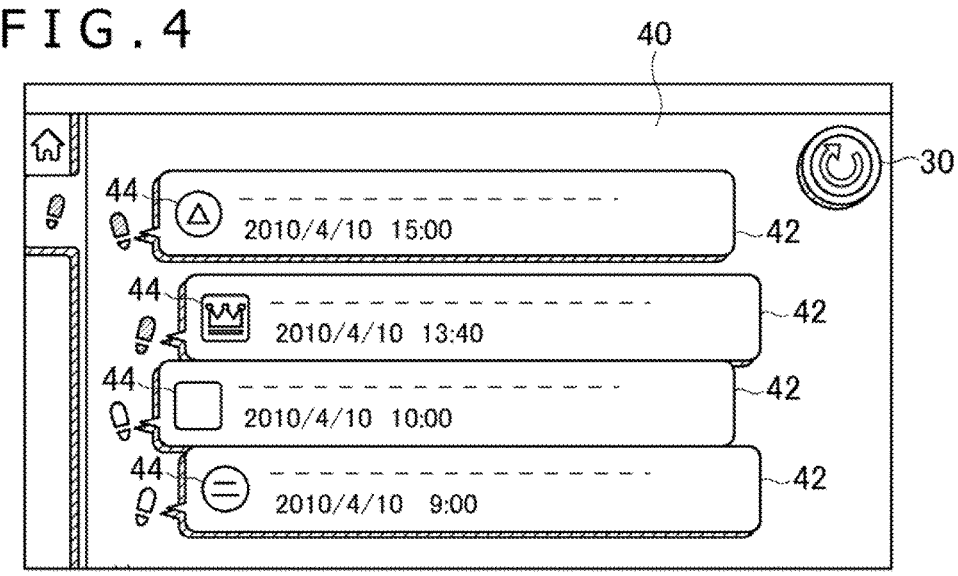
FIG. 4 is a view depicting an example of a movement route image.

FIG. 4 is a view depicting an example of a movement route image 40 displayed when the user taps the button icon 22. The movement route image 40 actually has a generally vertically elongated shape, and part of the movement route image 40 is displayed on the touch screen 14a. If the user carries out a predetermined operation such as flicking on the touch screen 14a, then the portion of the movement route image 40 displayed on the touch screen 14a can be changed. Consequently, it is possible to display an arbitrary portion of the entire movement route image 40 to be displayed on the touch screen 14a. Further, when the movement route image 40 is displayed on the touch screen 14a, the button icon 30 is disposed at a right upper position of the movement route image 40. In the present embodiment, even if the portion to be displayed on the touch screen 14a changes, the position of the button icon 30 in the touch screen 14a does not change.

The user terminal 14 repetitively measures the position of the own machine and retains the measured positions. In the movement route image 40, event record images 42 in each of which an event character string representative of an event which occurred at the retained position and measurement day and time are arranged are arranged in an order in which the measurement was carried out. In the present embodiment, the event record images 42 are arranged such that an event record image 42 associated with a newer measurement result is arranged at a higher position. Further, the event record images 42 can be tapped. Here, while an event record image in which an event character string and measurement day and time are arranged is adopted for the event record images 42, an address character string representative of an address of a retained position may be arranged in place of an event character string. The address character string associated with the position measurement position may be stored in an associated relationship with the position measurement position in advance in the user terminal 14, or may be stored in the server 12 similarly. In the latter case, if the position measurement position is transmitted to the server 12, then the address character string associated with the position measurement position is read out by the server 12 and transmitted to the user terminal 14.

While the user terminal 14 repetitively measures the position of the own machine by the position measurement unit 14b, only when a new measurement position is spaced from the latest position retained already by equal to or more than a predetermined distance (for example, 2 km), the user terminal 14 retains the new measurement position. On the contrary, if the new measurement position is spaced by less than the predetermined distance from the latest position retained already, then the user terminal 14 does not retain the new measurement position. Further, although the user terminal 14 retains a predetermined number of (for example, 20) measurement results, it selects, from among the measurement results, those which are significant to represent a route of movement of the user terminal 14. For example, the user terminal 14 calculates an evaluation value which is an increasing function of the elapsed period of time from a point of time of position measurement in the last cycle and the distance from the position measured in the immediately preceding measurement cycle for each measurement result and selects a predetermined number of those of the evaluation values in order beginning with the top one. Then, only the event record images 42 corresponding to the selected position measurement results are included into the movement route image 40. By this, it is possible to represent only a significant movement on the movement route image 40 and make it easy to understand the movement route image 40. Further, it is possible to reduce useless display thereby to utilize the touch screen 14a effectively. Further, at the left end of each event record image 42, an event image 44 associated with the event represented by the event character string arranged on the event record image 42 is arranged.

A footprint image of a white or black background is represented on the left side of each event record image 42 disposed on the movement route image 40 exemplified in FIG. 4. The footprint image of the white background represents that the corresponding event record image 42 is associated with a result of automatic position measurement after every fixed period of time. Meanwhile, the footprint image of the black background represents that the corresponding event record image 42 is associated with a result of position measurement carried out in response to a tapping operation for the button icon 30 by the user.

When the user taps the button icon 24 disposed on the main menu image 20 depicted in FIG. 3, a friend image in which an image representative of each friend (avatar image) and the latest information relating to the friend are disposed is displayed on the touch screen 14a. Further, when the user taps the button icon 26 disposed on the main menu image 20 depicted in FIG. 3, a discovery image in which the contents of events having occurred and information corresponding to users who satisfy a condition determined in advance are displayed in a list. Further, when the user taps the button icon 28 disposed on the main menu image 20 depicted in FIG. 3, a setting image for carrying out various settings is displayed on the touch screen 14a.

Figure 5:
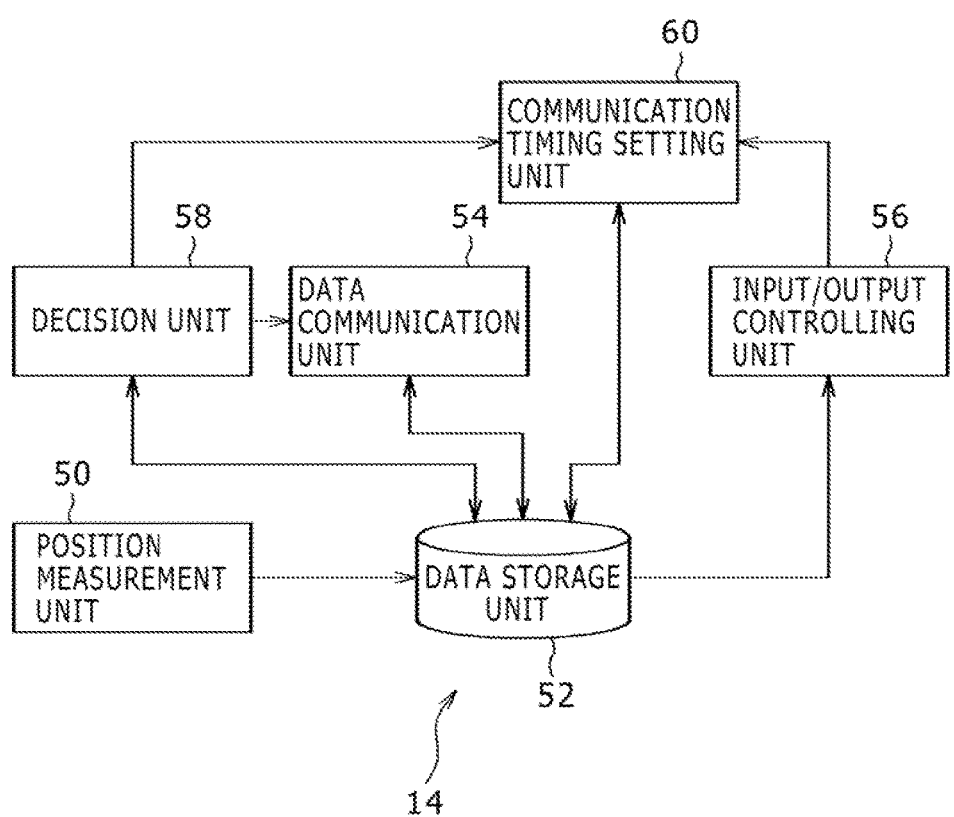
FIG. 5 is a functional block diagram depicting an example of functions of a user terminal according to the embodiment of the present invention.

FIG. 5 is a functional block diagram depicting an example of functions implemented by the user terminal 14 according to the present embodiment. As depicted in FIG. 5, the user terminal 14 according to the present embodiment functionally includes, for example, a position measurement unit 50, a data storage unit 52, a data communication unit 54, an input/output controlling unit 56, a decision unit 58, a communication timing setting unit 60 and so forth. It is to be noted that the user terminal 14 according to the present embodiment may have also functions which are not depicted in FIG. 5. The components mentioned are implemented by execution of a program according to the present embodiment by the user terminal 14 which is in the form of a computer. This program includes instructions for controlling a computer so as to function, for example, as the components depicted in FIG. 5. Further, this program may be downloaded from a different computer through a communication interface via a computer communication network and provided to the user terminal 14. Alternatively, the program may be stored in a computer-readable information recording medium such as an optical disk (for example, a CD-ROM, a DVD-ROM, a Blu-ray (registered trademark) disk or the like), a USB memory, a memory card or the like and provided to the user terminal 14 from the information recording medium.

The position measurement unit 50 is configured principally, for example, from the position measurement unit 14b and starts up the position measurement unit 14b periodically (for example, after every 30 minutes) to receive satellite signals (GPS signals) and then produces position coordinates (latitude and longitude) based on the received satellite signals. In the present embodiment, also when the user taps the button icon 30 (updating icon) to instruct for position measurement, the position measurement unit 14b is started up to receive satellite signals and produce position coordinates based on the satellite signals.

The data storage unit 52 in the present embodiment stores, for example, a predetermined number of (for example, 10) position coordinate data. The position coordinate data includes, for example, position coordinates and measurement date and time of the position coordinates. Every time the position measurement unit 50 produces position coordinates, it reads out position coordinates indicated by the position coordinate data having stored into the data storage unit 52 last and calculates the distance between the position coordinates produced newly and the read out position coordinates. Then, if the distance is equal to or longer than a predetermined distance (for example, 2 km), then the position measurement unit 50 stores the position coordinate data including the newly produced position coordinates and the measurement date and time of the position coordinates into the data storage unit 52. At this time, in the present embodiment, the position measurement unit 50 deletes those position coordinate data, which have been stored exceeding a predetermined number of days (for example, seven days) after the date and time of the measurement, from the data storage unit 52. Further, if the number of position coordinate data which are stored in the data storage unit 52 but have not been stored exceeding the predetermined number of days after the date and time of the measurement is equal to the predetermined number, then the position measurement unit 50 deletes the oldest position coordinate data and stores the newly produced position coordinate into the data storage unit 52 instead. On the other hand, if the distance between the newly produced position coordinates and the read out position coordinates is smaller than the predetermined distance, then the position measurement unit 50 discards the newly produced position coordinates without storing the same into the data storage unit 52.

Further, the data storage unit 52 stores also a predetermined number of (for example, five) game actual result data executed lately on the user terminal 14. The game actual result data includes, for example, a title ID of a data program, a viewing level, a total play time period, and the last play date and time. The title ID is information for identifying an individual game program. The total play time period is a total period of time for which the game program has been played. The viewing level is information representative of to which degree the user is absorbed in the game and is calculated from information of the difference between the release date of the game program and the date at present, total play time period and so forth. The last play date and time is date and time (startup date and time or end date and time) at which the game program was played last.

Further, the data storage unit 52 stores communication timing data indicative of timings at which transmission of position coordinate data and game actual result data to the server 12 and reception of data transmitted from the server 12 as a reply to the transmission are to be carried out. Here, as the data transmitted from the server 12, for example, event data indicative of an event which occurred at position coordinates included in the position coordinate data transmitted to the server 12 and so forth are listed. The value of the communication timing data in the present embodiment is represented in a unit of a second, for example, like "1:30:20, Aug. 27, 2012." It is to be noted that there is no limitation on the representation form of the point of time indicated by the communication timing data. For example, the point of time indicated by the reception time point data may be represented in a unit of a minute or in a unit of an hour.

The data communication unit 54 carries out transmission of position coordinate data and game actual result data to the server 12 and reception of event data and so forth from the server 12. The server 12 in the present embodiment manages at least one of position coordinate data and game actual result data and event data in an associated relationship with each other. Therefore, the server 12 in the present embodiment can specify event data and so forth to be transmitted to the user terminal 14 in response to reception of position coordinate data and game actual result data.

The input/output controlling unit 56 carries out production and display of various screen images to be displayed on the touch screen 14a of the user terminal 14, execution of processing in response to an operation of the touch screen 14a by the user and so forth. The decision unit 58 decides whether or not communication of data is to be carried out when a timing (hereinafter referred to as communication timing T) indicated by the communication timing data comes. The communication timing setting unit 60 carries out setting of a new communication timing by changing the value of the communication timing data as occasion demands.

Figure 6:
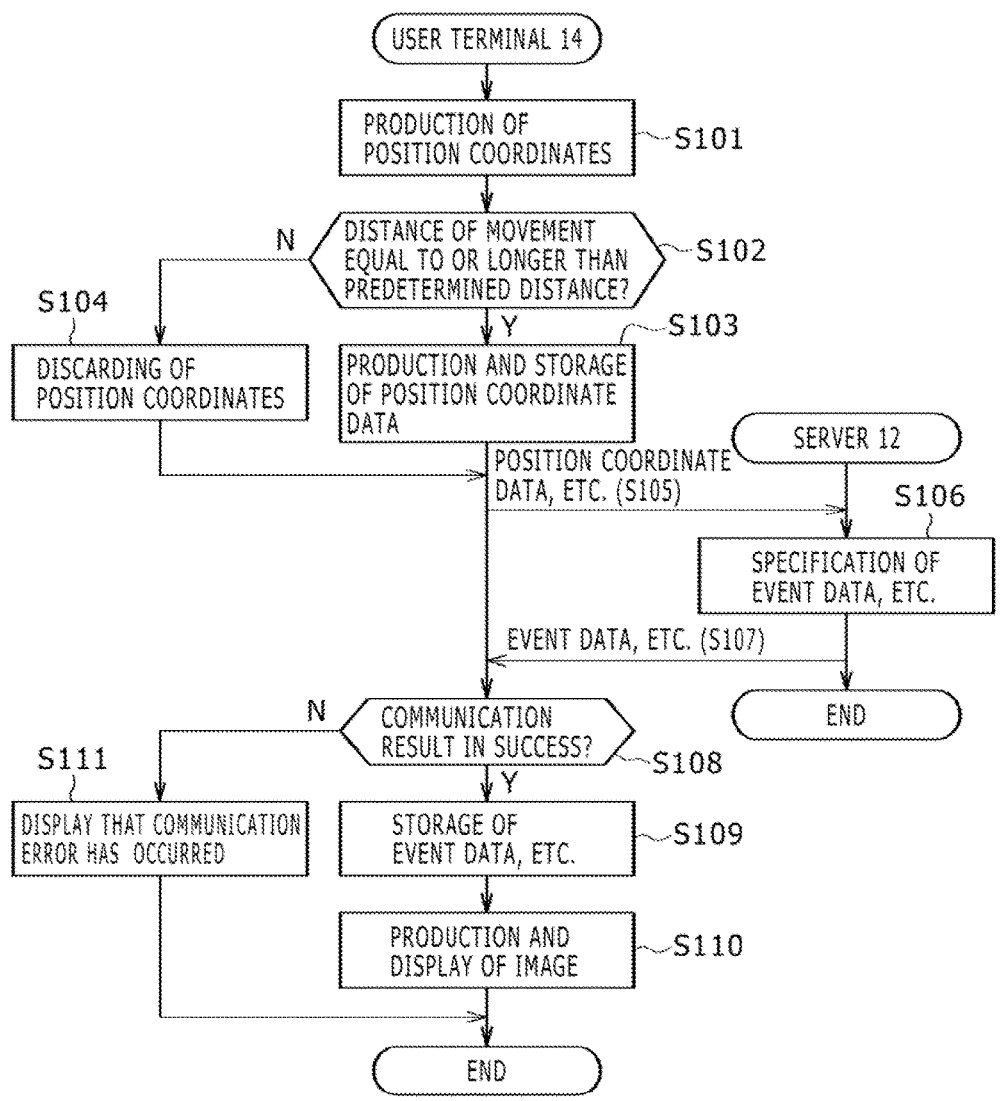
FIG. 6 is a flow chart illustrating an example of a flow of a process carried out by the user terminal according to the embodiment of the present invention.

Here, an example of a flow of a process (hereinafter referred to as manual updating process) executed by the user terminal 14 in the present embodiment when the user taps the button icon 30 disposed at a right upper location of the main menu image 20 depicted in FIG. 3 or the movement route image 40 depicted in FIG. 4 is described with reference to a flow chart exemplified in FIG. 6.

First, the position measurement unit 50 starts up the position measurement unit 14b to receive satellite signals and produces position coordinates based on the received satellite signals (S101). Then, the position measurement unit 50 decides whether or not the distance (distance of movement) between position coordinates indicated by position coordinate data having been stored last into the data storage unit 52 and position coordinates produced newly is equal to or greater than a predetermined distance (for example, 2 km) (S102). If it is decided by the process indicated by S102 is equal to or greater than the predetermined distance (S102: Y), then the position measurement unit 50 produces position coordinate data including the newly produced position coordinates and measurement date and time of the position coordinates and stores the position coordinate data into the data storage unit 52 (S103). It is to be noted that, in the process indicated at S103, the position measurement unit 50 deletes position coordinate data which have been stored by more than a predetermined number of days (for example, seven days) from the date and time of the measurement from the data storage unit 52. Further, if the number of position coordinate data which are stored in the data storage unit 52 but have not been stored by more than the predetermined number of days from the date and time of the measurement is equal to the predetermined number, then the position measurement unit 50 deletes the oldest position coordinate data. Then, the position measurement unit 50 stores the newly produced position coordinate into the data storage unit 52 instead.

If it is decided by the process indicated at S102 that the distance between the position coordinates indicated by the position coordinate data having been stored last into the data storage unit 52 and the newly produced position coordinates is smaller than the predetermined distance (S102: N), then the position measurement unit 50 discards the newly produced position coordinates without storing the same into the data storage unit 52 (S104).

Then, the data communication unit 54 transmits the position coordinate data and the game actual result data stored in the data storage unit 52 to the server 12. The server 12 receives the data (S105).

Then, the server 12 specifies event data and so forth which become a transmission target based on the data transmitted by the process indicated at S105 (S106). Then, the server 12 transmits the event data and so forth specified by the process indicated at S106 to the user terminal 14. The data communication unit 54 receives the event data and so forth (S107).

Then, the decision unit 58 decides whether or not the communication by the processes at S105 and S107 has resulted in success (S108). If it is decided that the communication has resulted in success (S108: Y), then the data communication unit stores the event data and so forth received by the process indicated at S107 into the data storage unit 52 (S109). Then, the input/output controlling unit 56 produces an updated image based on the event data and so forth stored in the data storage unit 52 and causes the image to be displayed on the touch screen 14a (S110), and then the processing in the present processing example is ended.

It is to be noted that, when the movement route image 40 is displayed by the process indicated at S110 described hereinabove, a footprint image of the black background is disposed at the left side of an event record image 42 produced based on the event data received by the process indicated at S107 described hereinabove.

If it is decided by the process indicated at S108 that the communication by the process at S105 or S107 results in failure (S108: N), then the input/output controlling unit 56 controls the touch screen 14a to display that a communication error has occurred (S111), and then the processing indicated by the present processing example is ended.

As described hereinabove, in the present embodiment, if the updating icon is tapped, then the user terminal 14 carries out communication of data with the server 12. In this manner, in the present embodiment, communication of data in accordance with a request from the user is carried out.

Further, separately from the manual updating process, the user terminal 14 in the present embodiment attempts communication (hereinafter referred to as automatic updating process) of data with the server 12 when a communication timing T comes.

Figure 7:
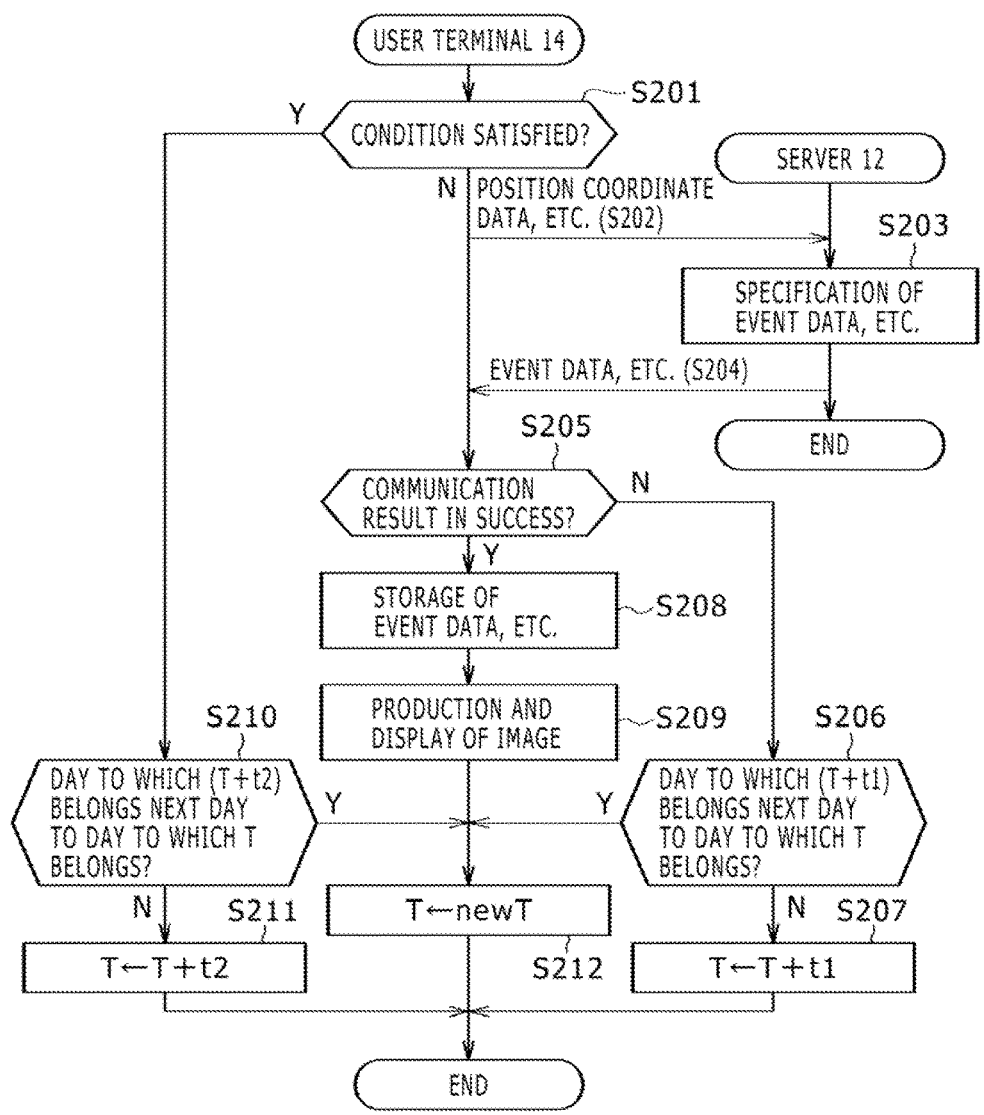
FIG. 7 is a flow chart illustrating another example of a flow of a process carried out by the user terminal according to the embodiment of the present invention.

Here, an example of a flow of processing (automatic updating process) carried out by the user terminal 14 in the present embodiment when a communication timing T comes is described with reference to a flow chart exemplified in FIG. 7.

When the communication timing T comes, the decision unit first decides whether or not a predetermined condition different from the condition that communication with the server is impossible is satisfied (S201). In the present embodiment, for example, the decision unit 58 decides whether or not the user terminal 14 is in a situation in which the manual updating process is being carried out (namely, whether or not the user terminal 14 is in a situation in which one of the processes at S101 to S111 described hereinabove is being carried out).

If it is decided that the condition is not satisfied (S201: N), then the data communication unit 54 transmits position coordinate data and game actual result data stored in the data storage unit 52 to the server 12. The server 12 receives the data (S202).

Then, the server 12 specifies event data and so forth which become a transmission target based on the data transmitted by the process indicated at S202 (S203). Then, the server 12 transmits the event data and so forth specified by the process indicated at S203 to the user terminal 14. The data communication unit 54 receives the event data and so forth (S204).

Then, the decision unit 58 decides whether or not the communication by the processes indicated at S202 and S204 results in success (S205). If it is decided that the communication results in failure (S205: N), then the decision unit 58 decides whether or not the day in which the date and time (T+t1) later by a first time period t1 (in the present embodiment, for example, six hours) determined in advance than the communication timing T is a day next to the day to which the communication timing T belongs (S206). For example, if the value at present of the communication timing data is "21:20:10, Aug. 27, 2012," then the date and time after six hours from the communication timing T is "3:20:10, Aug. 28, 2012." Further, the day to which the date and time (T+t1) later by six hours than the communication timing T is a day next to the day to which the communication timing T belongs.

If it is decided by the process indicated at S206 that the day to which the date and time (T+t1) later by the first time period t1 than the communication timing T is a day next to the day to which the communication timing T belongs (S206: Y), then the processing advances to a process indicated at S212. Otherwise (S206: N), the communication timing setting unit 60 sets the timing (T+t1) later by the first time period (for example, six hours) than the communication timing T as a new communication timing T (S207), and then the processing indicated by the present processing example is ended. In the process indicated at S207, the communication timing setting unit 60 changes the value of the communication timing data so that, for example, the value of the communication timing data becomes the timing (T+t1) later by the first time period (for example, six hours) than the communication timing T.

If it is decided by the process indicated at S205 that the communication in the processes indicated at S202 and S204 results in success (S205: Y), then the data communication unit stores the event data and so forth received by the process indicated at S204 into the data storage unit 52 (S208). Then, the input/output controlling unit 56 produces an updated image based on the event data and so forth stored in the data storage unit 52 and controls the touch screen 14a to display the image (S209).

It is to be noted that, if the movement route image 40 is displayed by the process indicated in S209 described hereinabove, then a footprint image of the white background is disposed at the left side of the event record image 42 produced based on the event data received by the process indicated at S204 described hereinabove.

If it is decided by the process indicated at S201 that the condition is satisfied (S201: Y), then the decision unit 58 decides whether or not the day to which the date and time (T+t2) later by a second time period t2 (in the present embodiment, for example, 15 minutes) determined in advance than the communication timing T is tomorrow (S210). In the present embodiment, the second time period t2 (for example, 15 minutes) is shorter than the first time period t1 (for example, six hours).

If it is decided by the process indicated by S210 that the day to which the date and time (T+t2) later by the second time period t2 than the communication timing T is a day next to the day to which the communication timing T belongs (S210: Y), then the processing advances to a process indicated by S212. Otherwise (S210: N), the communication timing setting unit 60 sets the timing (T+t2) later by the second time period (for example, 15 minutes) than the communication timing T as a new communication timing T (S211), and then the processing indicated by the present processing example is ended. In the process indicated at S211, the communication timing setting unit 60 changes the value of the communication timing data such that, for example, the value of the communication timing data becomes the timing (T+t2) later by the second time period (for example, 15 minutes) than the communication timing T.

If it is decided by the process indicated at S206 that the day to which the date and time (T+t1) later by the first time period t1 than the communication timing T is a day next to the day to which the communication timing T belongs (S206: Y), if the process indicated at S209 is ended, or if it is decided by the process indicated at S210 that the day to which the date and time (T+t2) later by the second time period t2 than the communication timing T is a day next to the day to which the communication timing T belongs (S210: Y), then the communication timing setting unit 60 sets date and time newT determined based on a rule determined in advance as a new communication timing T (S212), whereafter the process indicated by the present processing example is ended. By the process indicated at S212, the communication timing setting unit 60 changes the value of the communication timing data such that, for example, the value of the communication timing data becomes the date and time newT determined based on the rule determined in advance.

By the process indicated at S212, the communication timing setting unit 60 determines the one time point newT within a time range (in the present embodiment, for example, from 0:00 to 6:00) of the next day to the communication timing T set at present as a new communication timing T. In the present embodiment, the communication timing setting unit 60 determines the one time point newT calculated in accordance with a mathematical formula determined in advance, for example, based on identification information of the user terminal 14 (for example, MAC (Media Access Control) address) and the value representative of the date of the next day to the communication timing T set at present. Then, the communication timing setting unit 60 updates the value of the communication timing data so as to indicate the determined time point newT. The timing determined from within the time range determined in advance is set as the new communication timing T in this manner.

In the present embodiment, the communication timing T set first in each day (the timing is hereinafter referred to as initially set communication timing) as described above is set so as to belong to a time zone of the midnight within which it is considered that the traffic amount of the network is comparatively small.

Further, since the communication timing setting unit 60 in the present embodiment calculates the initially set communication timing based on the identification information of the user terminal 14 as described above, the plurality of user terminals 14 are different from each other in initially set communication timing in the same one day. In this manner, in the present embodiment, the possibility that the plurality of user terminals 14 may communicate all together with the server 12 to tighten the traffic of the network is reduced.

Further, since the communication timing setting unit 60 in the present embodiment calculates the initially set timing based on the value indicative of a date as described hereinabove, the initially set timing set by the user terminal 14 differs every day. It is to be noted that it is preferable, for example, if the mathematical formula described hereinabove is set such that the difference between the initially set timing to be determined and the initially set timing in the preceding day becomes two hours or more. In this manner, in the present embodiment, the possibility that such a situation that the user who is living in a similar rhythm every day cannot communicate with the server 12 at the initially set timing over a plurality of successive days may occur is reduced.

It is to be noted that the user terminal 14 may execute, when it is decided by the process indicated at S201 in the processing example described hereinabove that the condition is satisfied, the process indicated at S211 without executing the process indicated at S210 described hereinabove, whereafter the processing indicated by the processing example described hereinabove is ended.

As described hereinabove, in the present embodiment, if the user terminal 14 is incommunicatable with the server 12 and does not carry out communication, then the timing (T+t1) later by the first time period than the communication timing T is set as a new communication timing T. Then, if a predetermined condition different from the condition that the user terminal 14 is incommunicatable with the server 12 is satisfied and communication is not carried out (for example, if the manual updating process is being executed), then the timing (T+t2) later by the second time period than the communication timing T is set as a new communication timing T. In this manner, with the present embodiment, when the user terminal 14 is incommunicatable with the server 12 which is a communication counterpart and communication is not carried out, the timing at which next communication is to be attempted becomes later than that when the condition different from the condition that the user terminal 14 is incommunicatable with the server 12 is satisfied and communication is not carried out.

It is to be noted that the present invention is not limited to the embodiment described hereinabove.

For example, in place of executing the process indicated at S108 described hereinabove, the user terminal 14 may decide whether or not the communication between the user terminal 14 and the server 12 is possible before the process indicated at S105 described hereinabove. Then, when it is decided that the communication is possible, the user terminal 14 may execute the processes indicated at S105 to S107, S109, and S110 described hereinabove, but when it is decided that the communication is impossible, the user terminal 14 may execute the process indicated at S111 described hereinabove.

Alternatively, for example, in place of executing the process indicated at S205 described hereinabove, the user terminal 14 may execute a process of deciding whether or not communication between the user terminal 14 and the server 12 is possible before the process indicated at S202 described hereinabove. Then, when it is decided that the communication is possible, the user terminal 14 may execute the processes indicated at S202 to S204, S208, S209, and S211 described hereinabove. However, when it is decided that the communication is impossible, the user terminal 14 may execute the processes indicated at S206 and S207 described hereinabove or the processes indicated at S206 and S211 described hereinabove.

Alternatively, the user terminal 14 may execute the decision of whether or not communication between the user terminal 14 and the server 12 is possible before the decision of whether or not the user terminal 14 is in such a situation that the manual updating process is being carried out. Then, if it is decided that the communication is impossible, then the user terminal may execute the processes indicated at S206 and S207 described hereinabove or the processes indicated at S206 and S211 described hereinabove.

Alternatively, if it is decided that the user terminal is in a situation in which the manual updating process is being carried out, then when the manual updating process comes to an end (for example, immediately after the manual updating process ends), the user terminal 14 may attempt the automatic updating process (namely, the processes indicated at S201 to S211 described hereinabove may be executed).

Alternatively, for example, the position measurement unit 50 may acquire position coordinates of the user terminal 14 based on identification information of a wireless access point with which communication is possible by the wireless LAN communication unit 14*d* and other necessary information. For example, identification information of wireless access points and position coordinates may be stored in an associated relationship with each other in the server 12 such that, the position measurement unit 50 transmits identification information of the server 12 to acquire position coordinates associated with the identification information. The position measurement unit 50 may transmit identification information of a plurality of wireless access points and intensities of radio waves from the wireless access points to a server such that the server synthesizes position coordinates of the wireless access points through weighting depending upon the radio wave intensities to calculate position coordinates, which are transmitted to the position measurement unit 50. Similarly, position coordinates of the user terminal 14 may be acquired based on identification information of a portable telephone base station with which the portable telephone communication unit 14*c* can communicate and other necessary information. It is to be noted that, in place of acquisition of position coordinates by the position measurement unit 50 and transmission of the position coordinates to the server 12, a wireless access point, identification information of a wireless access point or a portable telephone base station, and other necessary information may be transmitted to the server 12 such that the server 12 acquires position coordinates corresponding to the information.

Further, the particular character strings and numerical values given hereinabove and the particular character strings in the drawings are exemplary and there is no limitation to the character strings and the numerical values.

The invention claimed is:

1. An information processing apparatus, comprising:
a decision unit configured to make a first determination periodically, at a time T after a current periodic reference time interval has passed, whether a user has carried out a predetermined action; and
a communication unit configured to: (i) make no attempt to exchange data with a communication counterpart over a network at the time T after the periodic reference time interval when the first determination is positive, and (ii) automatically attempt to exchange data with the communication counterpart over the network at the time T after the current periodic reference time interval has passed when the first determination is negative, where the decision unit is further configured to make a second determination whether the attempt to exchange data was successful; and
a setting unit configured to: (i) make no adjustment to the time T when the second determination is positive such that a next time at which the decision unit makes the first determination is the time T after a next periodic reference time interval has passed, (ii) adjust the time T by a first delay time t1 when the second determination is negative, such that a next time at which the decision unit makes the first determination is T+t1 after the current periodic reference time interval has passed, and (iii) adjust the time T by a second delay time t2 when the first determination is positive, where t2 is substantially less than t1, such that a next time at which the decision unit makes the first determination is T+t2 after the current periodic reference time interval has passed.

2. The information processing apparatus according to claim 1, wherein the predetermined action by the user is that the user has manually started a communications session between the information processing apparatus and the communication counterpart.

3. The information processing apparatus according to claim 1, wherein the periodic reference time interval is about 24 hours.

4. The information processing apparatus according to claim 1, wherein the first delay time t1 is at least one hour and the second delay time is less than one hour.

5. The information processing apparatus according to claim 1, wherein:
the decision unit is further configured to make a third determination, when the second determination is negative and prior to the setting unit adjusting the time T by the first delay time t1, whether T+t1 after the current periodic reference time interval has passed would extend into a next day; and
the setting unit is configured to: (i) adjust the time T by the first delay time t1 when the second determination is negative and the third determination is negative, such that the next time at which the decision unit makes the first determination is T+t1 after the current periodic reference time interval has passed, and (ii) make no adjustment to the time T when the second determination is negative and the third determination is positive, such that the next time at which the decision unit makes the first determination is the time T after the next periodic reference time interval has passed.

6. The information processing apparatus according to claim 1, wherein:
the decision unit is further configured to make a third determination, when the first determination is positive and prior to the setting unit adjusting the time T by the second delay time t2, whether T+t2 after the current periodic reference time interval has passed would extend into a next day; and
the setting unit is configured to: (i) adjust the time T by the second delay time t2 when the first determination is positive and the third determination is negative, such that the next time at which the decision unit makes the first determination is T+t2 after the current periodic reference time interval has passed, and (ii) make no adjustment to the time T when the first determination is positive and the third determination is positive, such that the next time at which the decision unit makes the first determination is the time T after the next periodic reference time interval has passed.

7. An information processing method, comprising:
making a first determination periodically, at a time T after a current periodic reference time interval has passed, whether a user has carried out a predetermined action;
making no attempt to exchange data with a communication counterpart over a network at the time T after the periodic reference time interval when the first determination is positive;
automatically attempting to exchange data with the communication counterpart over the network at the time T after the current periodic reference time interval has passed when the first determination is negative, and making a second determination whether the attempt to exchange data was successful;
making no adjustment to the time T when the second determination is positive such that a next time at which the first determination is made is the time T after a next periodic reference time interval has passed;
adjusting the time T by a first delay time t1 when the second determination is negative, such that a next time at which the decision unit makes the first determination is T+t1 after the current periodic reference time interval has passed; and
adjusting the time T by a second delay time t2 when the first determination is positive, where t2 is substantially less than t1, such that a next time at which the first determination is made is T+t2 after the current periodic reference time interval has passed.

8. A computer having a processor operating to execute a program such that the computer implements actions, comprising:
making a first determination periodically, at a time T after a current periodic reference time interval has passed, whether a user has carried out a predetermined action;
making no attempt to exchange data with a communication counterpart over a network at the time T after the periodic reference time interval when the first determination is positive;
automatically attempting to exchange data with the communication counterpart over the network at the time T after the current periodic reference time interval has passed when the first determination is negative, and making a second determination whether the attempt to exchange data was successful;
making no adjustment to the time T when the second determination is positive such that a next time at which the first determination is made is the time T after a next periodic reference time interval has passed;
adjusting the time T by a first delay time t1 when the second determination is negative, such that a next time at which the decision unit makes the first determination is T+t1 after the current periodic reference time interval has passed; and
adjusting the time T by a second delay time t2 when the first determination is positive, where t2 is substantially less than t1, such that a next time at which the first determination is made is T+t2 after the current periodic reference time interval has passed.

9. A non-transitory, computer-readable information recording medium in or on which a program is stored, the program for causing a computer implement actions, comprising:
making a first determination periodically, at a time T after a current periodic reference time interval has passed, whether a user has carried out a predetermined action;
making no attempt to exchange data with a communication counterpart over a network at the time T after the periodic reference time interval when the first determination is positive;
automatically attempting to exchange data with the communication counterpart over the network at the time T after the current periodic reference time interval has passed when the first determination is negative, and making a second determination whether the attempt to exchange data was successful;
making no adjustment to the time T when the second determination is positive such that a next time at which the first determination is made is the time T after a next periodic reference time interval has passed;
adjusting the time T by a first delay time t1 when the second determination is negative, such that a next time at which the decision unit makes the first determination is T+t1 after the current periodic reference time interval has passed; and
adjusting the time T by a second delay time t2 when the first determination is positive, where t2 is substantially less than t1, such that a next time at which the first determination is made is T+t2 after the current periodic reference time interval has passed.

* * * * *